US008073261B2

(12) United States Patent
Skans

(10) Patent No.: US 8,073,261 B2

(45) Date of Patent: Dec. 6, 2011

(54) CAMERA TAMPERING DETECTION

(75) Inventor: Markus Skans, Lund (SE)

(73) Assignee: Axis AB, Lund (SE)

( * ) Notice: Subject to any disclaimer, the term of this patent is extended or adjusted under 35 U.S.C. 154(b) by 1026 days.

(21) Appl. No.: 11/940,687

(22) Filed: Nov. 15, 2007

(65) Prior Publication Data

US 2008/0152232 A1 Jun. 26, 2008

Related U.S. Application Data

(60) Provisional application No. 60/901,554, filed on Feb. 15, 2007.

(30) Foreign Application Priority Data

Dec. 20, 2006 (EP) .................................... 06126634

(51) Int. Cl.
*G06K 9/00* (2006.01)
*G06K 9/48* (2006.01)
*G06K 9/62* (2006.01)
*G10L 21/00* (2006.01)
*G03B 17/00* (2006.01)

(52) U.S. Cl. ........ 382/209; 382/103; 382/199; 704/273; 396/427

(58) Field of Classification Search .................. 382/276, 382/209
See application file for complete search history.

(56) References Cited

U.S. PATENT DOCUMENTS 5,099,322 A 3/1992 Gove
5,434,927 A * 7/1995 Brady et al. .................. 382/104
5,471,239 A 11/1995 Hill et al.
5,732,146 A 3/1998 Yamada et al.
5,835,163 A 11/1998 Liou et al.
5,956,424 A 9/1999 Wootton et al.
6,462,774 B1 * 10/2002 Bildstein ....................... 348/143
6,781,637 B2 8/2004 Kimura
6,801,661 B1 * 10/2004 Sotak et al. ................... 382/203
6,844,818 B2 * 1/2005 Grech-Cini ................... 340/628
7,123,769 B2 * 10/2006 Xiong ........................... 382/199
7,130,468 B1 * 10/2006 Meyer et al. .................. 382/219
7,227,893 B1 * 6/2007 Srinivasa et al. ......... 375/240.08
(Continued)

FOREIGN PATENT DOCUMENTS

EP 0 984 412 3/2000
(Continued)

OTHER PUBLICATIONS

Makarov A, "Comparison of Background Extraction Based Intrusion Detection Algorithms" ICIP96, IEEE, 1996.*
(Continued)

*Primary Examiner* — Vikkram Bali
*Assistant Examiner* — Michelle Entezari
(74) *Attorney, Agent, or Firm* — Volpe and Koenig, P.C.

(57) ABSTRACT

A method and a module for identifying possible tampering of a camera view. The method comprising receiving an image for analysis from an image sequence, converting the received image into an edge image, generating a similarity value indicating a level of similarity between said edge image and a reference edge image, indicating possible tampering of the camera view if the similarity value is within a specified tampering range, and updating the reference edge image by combining a recently analyzed edge image with the reference edge image in case of each one of a predetermined number of consecutively analyzed images does not result in an indication of possible tampering.

24 Claims, 4 Drawing Sheets

U.S. PATENT DOCUMENTS

| | | | | |
|---|---|---|---|---|
| 7,751,647 | B2 * | 7/2010 | Pikaz | 382/278 |
| 7,859,419 | B2 * | 12/2010 | Shen-Kuen et al. | 340/628 |
| 2003/0123753 | A1 * | 7/2003 | Chow | 382/289 |
| 2007/0177800 | A1 * | 8/2007 | Connell | 382/181 |

FOREIGN PATENT DOCUMENTS

| | | | |
|---|---|---|---|
| EP | 1 596 335 | | 11/2005 |
| EP | 1 672 604 | | 6/2006 |
| FR | 2 814 894 | | 4/2002 |
| FR | 2 814 896 | | 4/2002 |
| GB | 2 391 218 | | 2/2004 |
| JP | 61116490 | A | 6/1986 |
| JP | 9050525 | A | 2/1997 |
| JP | 2002304677 | A | 10/2002 |
| JP | 2004102971 | A | 4/2004 |
| JP | 2006260443 | A | 9/2006 |
| WO | 98/28706 | | 7/1998 |
| WO | 0148696 | A1 | 7/2001 |
| WO | 03043340 | A1 | 5/2003 |
| WO | 2005/109186 | | 11/2005 |
| WO | WO 2006002466 | A1 * | 1/2006 |

OTHER PUBLICATIONS

Haritaoglu I, “A Fast Background Scene Modeling and Maintenance for OUtdoor Surveillance”, ICPR00, IEEE, 2000.*

Collins et al., “A System for video surveillance and monitoring”, Proceedings of the American Nuclear Society Eighth International Topical Meeting on Robotics and Remote Systems, 1999.*

Huwer S and Niemann H, “Adaptive change detection for real-time surveillance applications” Third IEEE International Workshop on Visual Surveillance VS00, Dublin Ireland 2000.*

Harasse et al.—“Automated Camera Dysfunction”, 6th IEEE Southwest Symposium on Image Analysis and Interpretation 2004, pp. 36-40, (Mar. 28-30, 2004).

“Customer Frequency I Instore-Marketing I People Counting I Tracking Studies”, Retrieved from http://www.visapix.de/en/, (Nov. 13, 2006).

“LLNL Smart Camera”, Nominal Technical Specifications, Retrieved from https://www-eng.llnl.gov/smart_camera/smart_camera.html, (Nov. 13, 2006).

“Smart Camera”, A State-of-the-Art Digital Video Surveillance System, Lawrence livermore National Laboratory, http://www-eng.llnl.gov/LLNL__Smart__Camera__Website/, (Livermore, CA, Nov. 13, 2006).

“Visioprime—Intelligent Video Processing—Home”, http://www.visioprime.com/index.asp, (Nov. 13, 2006).

“Visioprime—Intelligent Video Processing—White Papers—White Papers”, Retrieved from http://www.visioprime.com/whitepaperlist.asp?CatID=999, (Nov. 13, 2006).

VIS-Á-PIX GMBH, “Intrusion Detector”, (Berlin, Germany, 2006).

VIS-Á-PIX GMBH, “People Counter ”, (Berlin, Germany, 2006).

* cited by examiner

CAMERA TAMPERING DETECTION

TECHNICAL FIELD OF THE INVENTION

The present invention relates to a method for detecting camera tampering, to a module for detecting camera tampering, and to a monitoring camera detecting tampering of said monitoring camera.

BACKGROUND OF THE INVENTION

Monitoring systems including cameras for monitoring of premises, areas of particular interest and/or processes are widely used in order to provide frequently updated images from an image view of interest, i.e. to provide a video sequence of an environment of interest. A problem with monitoring by means of a camera is that the image view from the camera may be covered or in any other way obstructed or altered. For instance, the lens of the camera may be deliberately or unintentionally covered, e.g. by paint, powder, moisture, a piece of cloth, etc., the cameras may be deliberately or unintentionally redirected to present a camera view of no interest, the camera may be removed, or the camera may be severely defocused. In particular tampering of cameras is unwanted in a surveillance situation and can e.g. be an act of vandalism, preparation for a crime or simply produced by carelessness. Either way a surveillance camera can become of limited use when tampered with.

Hence there are a lot of ways a camera view may be obstructed or tampered with resulting in the camera delivering video sequences of no interest or hiding important events. Therefore it is important to automatically alert or raise an alarm when a camera is obstructed or tampered with.

One method for detecting camera dysfunctions is described in Harasse S, et al. "Automated Camera Dysfunction Detection". Symposium on Image Analysis and Interpretation, 2004. 6th IEEE Southwest, March 2004, pp 36-40. According to this document the dysfunction of a camera is detected by detecting displacement, obstruction or defocusing of the camera. The process of detecting the dysfunction of a camera includes accumulating strong edges from each frame of an image sequence of T frames into a pre-accumulator. Then N pre-accumulators are generated and stored. From the N pre-accumulators a temporal accumulator is generated. The temporal accumulator is updated by generating a new pre-accumulator, subtracting the oldest pre-accumulator from the temporal accumulator, and adding the new pre-accumulator to the temporal accumulator. In order to detect displacement of the camera a reference accumulator, generated in the same way as the temporal accumulator, and a current accumulator are matched using a block matching algorithm, which maximizes the normalized correlation between the two accumulators, and a relative translation between the reference accumulator and the current accumulator is identified. Obstruction is detected by dividing the image space into several blocks and estimating the quantity of information in each block by measuring the entropy. Focus change is detected by computing the gradient energy only where there are stable edges.

The above proposed dysfunction detection requires a lot of memory for storing image frames and different types of accumulators. Moreover, the detection requires a lot of processing capacity and is complex.

SUMMARY OF THE INVENTION

The object of the present invention is to improve identification of camera view tampering.

The object is achieved by means of a method for identifying possible tampering of a camera view according to claim 1, a module for identifying possible camera tampering according to claim 11, a monitoring camera including the module and a monitoring camera performing the method according to claim 20 and claim 21, respectively, and a computer program according to claim 22. Further embodiments of the invention are disclosed in the dependent claims.

In particular, according to one embodiment of a first aspect of the invention, a method for identifying possible tampering of a camera view comprises receiving an image for analysis from an image sequence, converting the received image into an edge image, generating a similarity value indicating a level of similarity between said edge image and a reference edge image. Moreover the method includes indicating possible tampering of the camera view if the similarity value is within a specified tampering range, and updating the reference edge image by combining a recently analyzed edge image with the reference edge image in case of each one of a predetermined number of consecutively analyzed images does not result in an indication of possible tampering.

According to one embodiment of a second aspect of the present invention a module for identifying possible camera tampering comprises means for receiving an image for analysis from an image sequence, and an edge image generator arranged to convert a received image into an edge image. The module further comprises a correlation evaluator arranged to generate a similarity value indicating a level of similarity between an edge image and a reference edge image and to indicate possible tampering of the camera view if the similarity value is within a specified tampering range, and a reference edge image updater arranged to update the reference edge image by combining a recently analyzed edge image with the reference edge image in case of each one of a predetermined number of consecutively analyzed images do not result in an indication of possible tampering.

The advantage of the above method and the above module is that they both require small amount of memory, that they both are simple and that they both require little processing capacity. Another advantage is that the method and module do not require that each image from an image sensor is analyzed, they do not even require that there is a constant number of frames between two analyzed images of the image sequence. This makes the method and module robust and possible to use in systems where other critical tasks may be prioritized.

Another advantage of the above method and module is that only two images to be used by the method and module need to be stored in the memory at any given time.

According to another embodiment and the first aspect of the invention, the resolution of the image to be converted to an edge image is decreased. According to the second aspect of the invention this is performed by means of a scaling means.

The decrease in resolution results in the advantages of making the tampering detection less sensitive to vibrations and minor movements, of the tampering detection requiring low processing capacity, and of the amount of memory needed is even more decreased.

According to yet another embodiment, the method comprises selecting a new image for analysis only after that at least one consecutive image of the image sequence has not been selected for analyzing. This results in the identification of tampering using even less processing capacity.

According to another embodiment, the method further comprises counting by means of a counter $n_{pt}$ in response to said indicating of possible tampering of the camera view.

According to yet another embodiment the method further comprises generation of an alarm signal if the counter $n_{pt}$ has reached a predetermined alarm limit. By requiring a plurality of possible camera tampering indications, before setting an alarm, the system becomes less sensitive to occasional obstructions not resulting from tampering with the monitoring camera.

According to another embodiment, the method further comprises counting by means of a counter $n_{nt}$ in response to said similarity value not being within said tampering range and resetting the counter $n_{pt}$ if the current analyzed image resulted in the counter $n_{nt}$ counting and the previously analyzed image resulted in the counter $n_{pt}$ counting. The resetting of the counter $n_{pt}$ counting analyzed images resulting in possible tampering when the analysis indicates non tampering results in that the alarm only is triggered when a predetermined number of consecutively analyzed images indicates possible tampering. This is advantageous in that the method becomes less sensitive to a plurality of occasional obstructions occurring more than once and wherein the camera view has been unobstructed in between the occasional obstructions.

According to another embodiment the counter $n_{nt}$ is reset if the currently analyzed image resulted in the counter $n_{pt}$ counting and the previously analyzed image resulted in the counter $n_{nt}$ counting.

According to yet another embodiment, said updating of the reference edge image is performed if the counter $n_{nt}$ has counted past a predetermined update limit. This is advantageous in that the updating of the reference edge image becomes robust and stable.

According to another embodiment, the updating of the reference edge image by combining a recently analyzed edge image with the reference edge image comprises combining the recently analyzed edge image multiplied with a first factor with the reference edge image multiplied with a second factor. This feature may also stabilize the reference edge image, as a new reference image only is partly affected by the edge image used for the update.

According to yet another embodiment the first factor is of a value less than one and the second factor is of a value corresponding to one minus the first factor. This feature may further stabilize the reference image.

According to another aspect of the invention the method or the module of the present invention may be used in a monitoring camera. The method and the module according to the invention may operate in environments providing limited resources and may therefore advantageously be implemented in a monitoring camera.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 1 schematically illustrates a possible monitoring network.

DETAILED DESCRIPTION OF AN EMBODIMENT

Figure 1:
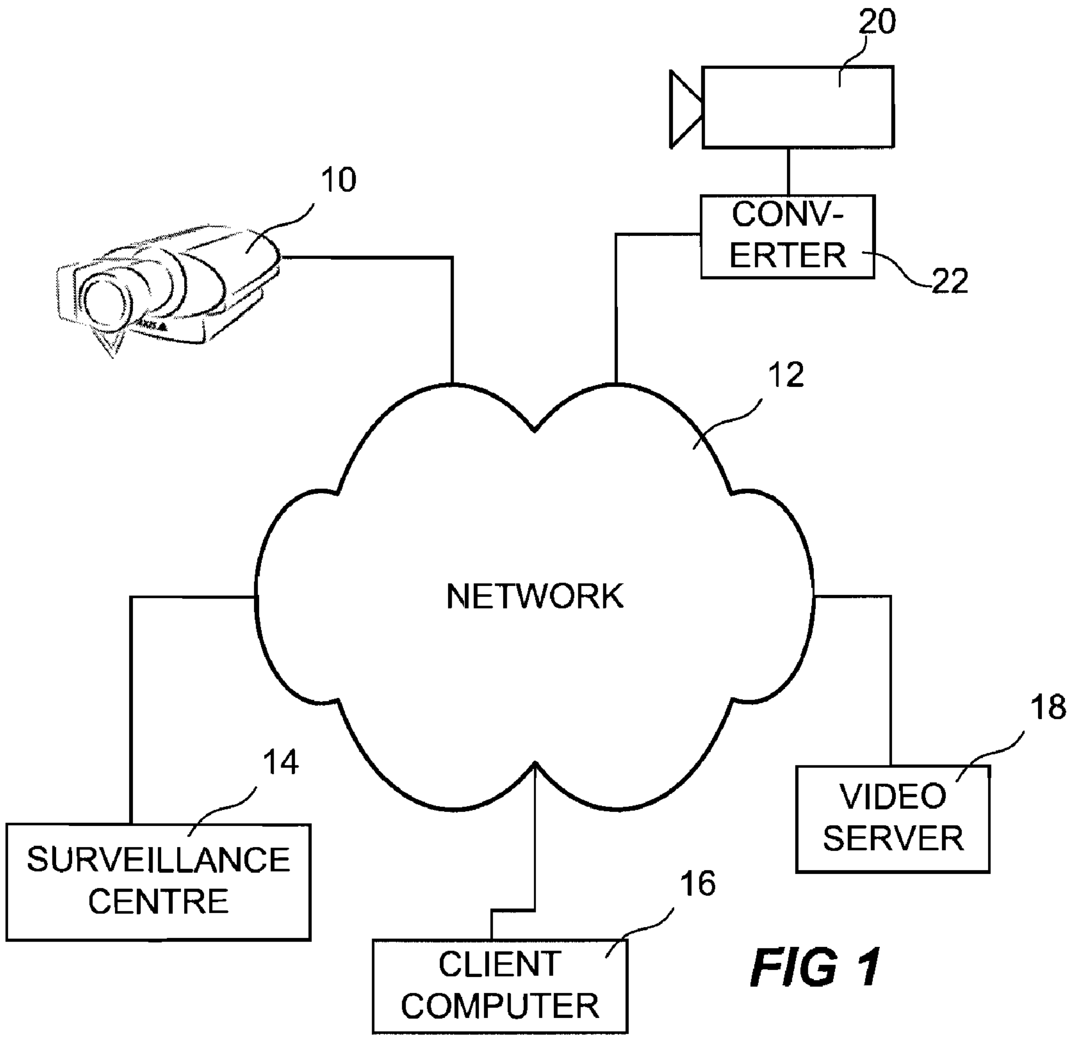

According to one embodiment of the invention, detecting a potential camera tampering is based on analysis of images from the image sequence generated by the monitoring camera. In FIG. 1 a monitoring camera 10, 20 is depicted as being connected via a network 12 to a surveillance centre 14, a client computer 16 and/or a video server 18. The figure is only intended to show different means that may interact with a monitoring camera 10. The monitoring camera 10 may be any digital camera 10 capable of generating image sequences or the monitoring camera 20 may be any analog camera 20 capable of generating image sequences and being connected to a converter 22 transforming the analog image information to digital image data and providing the digital image data to the network 12. In the rest of the description only monitoring camera 10 is referred to, however monitoring camera 10 shall be understood to be any one of the digital camera 10 or the combination of the analog camera 20 and the converter 22. In case of the monitoring camera being the analog camera the camera tampering detection is performed in the converter.

In one embodiment, the camera is a monitoring camera providing image sequences for transport via a network 12. For example, the monitoring camera 10 may be a digital camera enabled to send the image sequences via a computer network. The monitoring camera 10 may be arranged to communicate directly with a specific client computer 16, a surveillance centre 14 or a video server 18. The video server 18 may be a server for storing, manipulating and/or relaying image sequences from the monitoring camera. Accordingly, the video server 18 may be arranged to provide the surveillance centre 14 and/or the client computer 16 with information from the monitoring camera 10.

The camera tampering detection of the present invention is based on analysis of images from the image sequences captured by the monitoring camera 10. The analysis of said images may be performed in the monitoring camera 10, in the surveillance centre 14, in the client computer 16 or in the video server 18. However, it may be advantageous to perform the tampering detection in the monitoring camera because the camera tampering detection may be performed without loading the network with traffic using a lot of bandwidth. Hence, this advantage is particularly relevant for applications in which the user is not interested in being continuously provided with image sequences, e.g. in applications where the user only is provided with image sequences if something happens in the camera view. Systems not sending image sequences indiscriminately may be provided in order to save bandwidth or in order to facilitate scalability of the system, because it is easier to add further monitoring cameras to such a system.

In the following description the camera tampering detection is mainly described as being performed in the monitoring camera. However, the invention should not be seen as limited to such an implementation.

Figure 2:
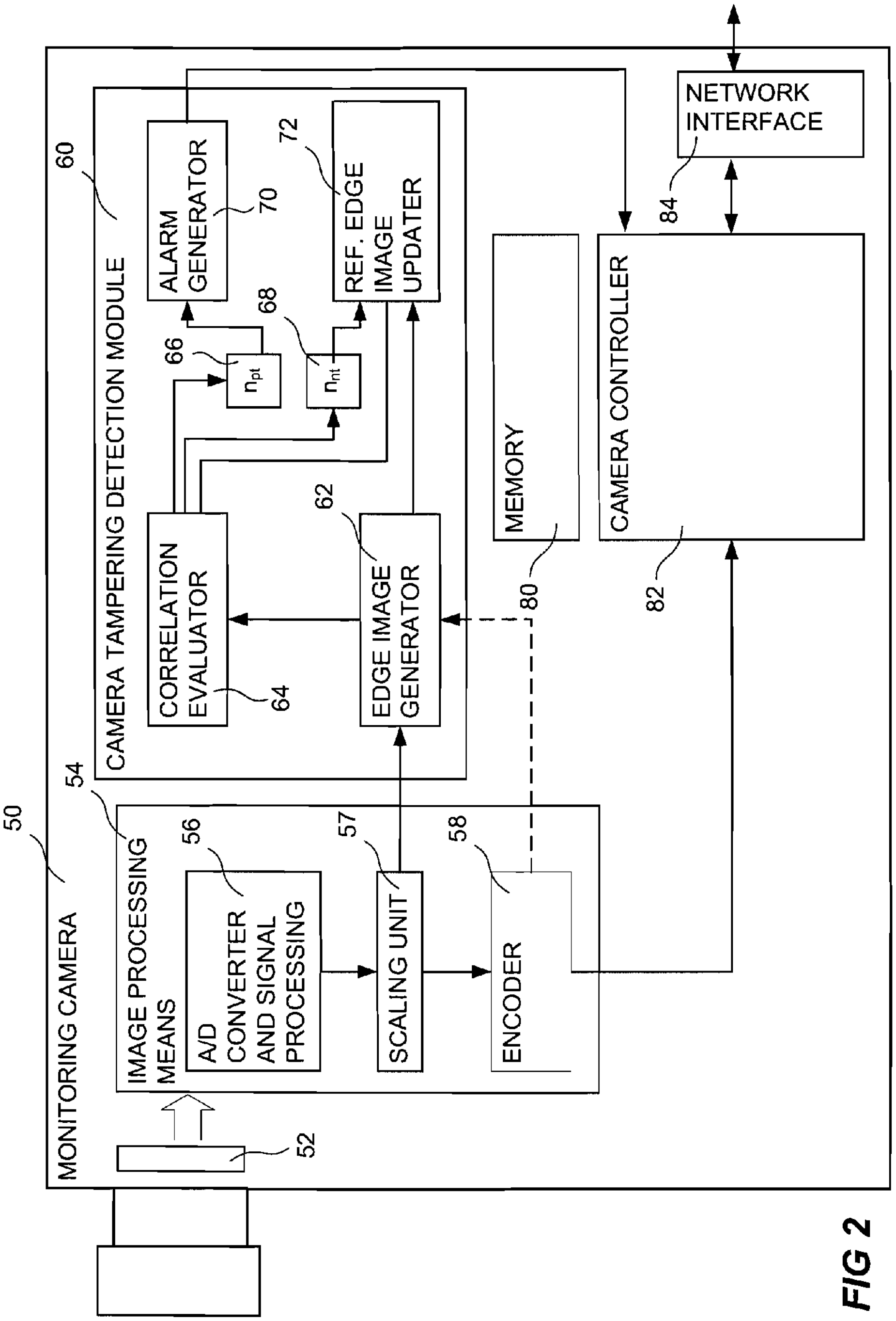
FIG. 2 is a schematic view of a digital monitoring camera according to an embodiment of the invention.

In FIG. 2 a digital monitoring camera 50 implementing the invention is schematically described. In order to facilitate the understanding of the invention, standard features of a monitoring camera not being relevant for the present invention are not described. The monitoring camera 50 includes an image sensor 52, e.g. a Charge Coupled Device (CCD), a CMOS-sensor or similar, for registering incident light, an image processing means 54, a camera tampering detection module 60, a memory 80, a camera controller 82, and a network interface 84.

The image processing means 54 receives information regarding the registered light and processes this information by means of an A/D-converter and signal processing means 56, which is well known by the skilled person. In some embodiments, e.g. when the image sensor 52 is a CMOS-sensor, the image sensor 52 includes A/D-converters and therefore there is no need for any A/D-converters in the image processing means 54. The result from the A/D-converter and signal processing means 56 is digital image data which, according to one embodiment, is processed in a scaling unit 57 before it is processed by an encoder 58. The scaling unit 57 is arranged to process the digital image data into at least one image of a particular size. However, it may be arranged to generate a plurality of images of different sizes, all representing the same image/frame provided by the A/D converter and signal processing means 56. According to another embodiment, the function of the scaling unit is performed by the encoder and in yet another embodiment there is no need to perform any scaling or resizing of the image from the image sensor.

The encoder 58 is arranged to encode the digital image data into any one of a plurality of known formats for continuous video sequences, for limited video sequences, for still images or for streamed images/video. For instance, the image information may be encoded into MPEG1, MPEG2, MPEG4, JPEG, Bitmapped, etc.

The camera tampering detection may be implemented as a camera tampering detection module 60 implemented in hardware or in software. The camera tampering detection module includes an edge image generator 62, a correlation evaluator 64, a counter 66 arranged to count edge images determined to represent possibly tampered image views, a counter 68 arranged to count edge images representing non tampered image views, an alarm generator 70 and a reference edge image updater 72. The edge image generator 62 of the camera tampering detection module 60 is arranged to receive image data from the scaling unit 57. Alternatively, depending on where the scaling of image data is performed, the edge image generator 62 may be arranged to receive image data from the scaling unit 57, the encoder 58 or from the A/D converter and signal processing means 56. If the camera tampering module 60 is not embedded in the monitoring camera 50 the edge image generator 62 may receive image data from a network connection, not showed. Further, the edge image generator 62 is arranged to generate an edge image, i.e. an image in which the contours are enhanced, of the retrieved image, i.e. the image to be analyzed. Before processing the retrieved image the resolution of the retrieved image has been decreased. This may be performed in the scaling unit 57, the encoder 58, or by the edge image generator 62. The generated edge image is then temporarily stored in memory 80.

Further, the correlation evaluator 64 is arranged to perform a correlation operation on said generated edge image stored in memory 80 and a reference edge image stored in memory 80. The correlation operation produces a similarity value. The correlation evaluator 64 is also arranged to decide, based on the similarity value and a predetermined level of similarity, whether the generated edge image is representing an image view of a tampered monitoring camera or of a non tampered monitoring camera.

Further, the correlation evaluator 64 is arranged to make each of the counters 66 and 68 count analyzed edge images representing a possibly tampered image view and analyzed edge images representing a non tampered image view. This may be implemented by arranging the correlation evaluator 64 to send a counting signal to the relevant counter, 66 or 68, in response to said decision. The counters are supposed to count the number of consecutive occurrences of analyzed images representing a possibly tampered image view and analyzed images representing a non tampered image view, respectively. Therefore, the correlation evaluator 64 is arranged to reset a counter 66, 68 every time the decision relating to the presently analyzed edge image differs from the previously analyzed edge image.

The alarm generator 70 is arranged to generate a signal indicating potential camera tampering in response to the counter 66 reaching or passing a predetermined number of counts. Accordingly, a signal indicating potential camera tampering is only generated if each one of a predetermined number of consecutively analyzed images is determined to represent a possibly tampered camera view. The alarm signal is passed on to the camera controller in order to be indicated on the monitoring camera or sent to some one or a central responsible for such alarms. The alarm may, for example, be sent to a surveillance center, to a client computer, or to a mobile telephone.

The reference edge image updater 72 is arranged to update the reference edge image in response to the counter 68 reaching or passing a predetermined number of counts. Accordingly, the reference edge image is only updated if each one of a predetermined number of consecutively analyzed images is decided to represent a non tampered camera view.

The monitoring camera further comprises a camera controller 82 and a network interface 84. The camera controller controls the general functionality of the monitoring camera and arranges information to be sent via the network interface 84. The camera controller 82 may be arranged to transfer an indication of potential camera tampering to a device connected to the network in response to the signal indicating potential camera tampering being generated by the alarm generator 70. Said indication may be transferred to a client computer, a surveillance centre, a video server, or any other device intended to present the indication to a user.

Figure 3:
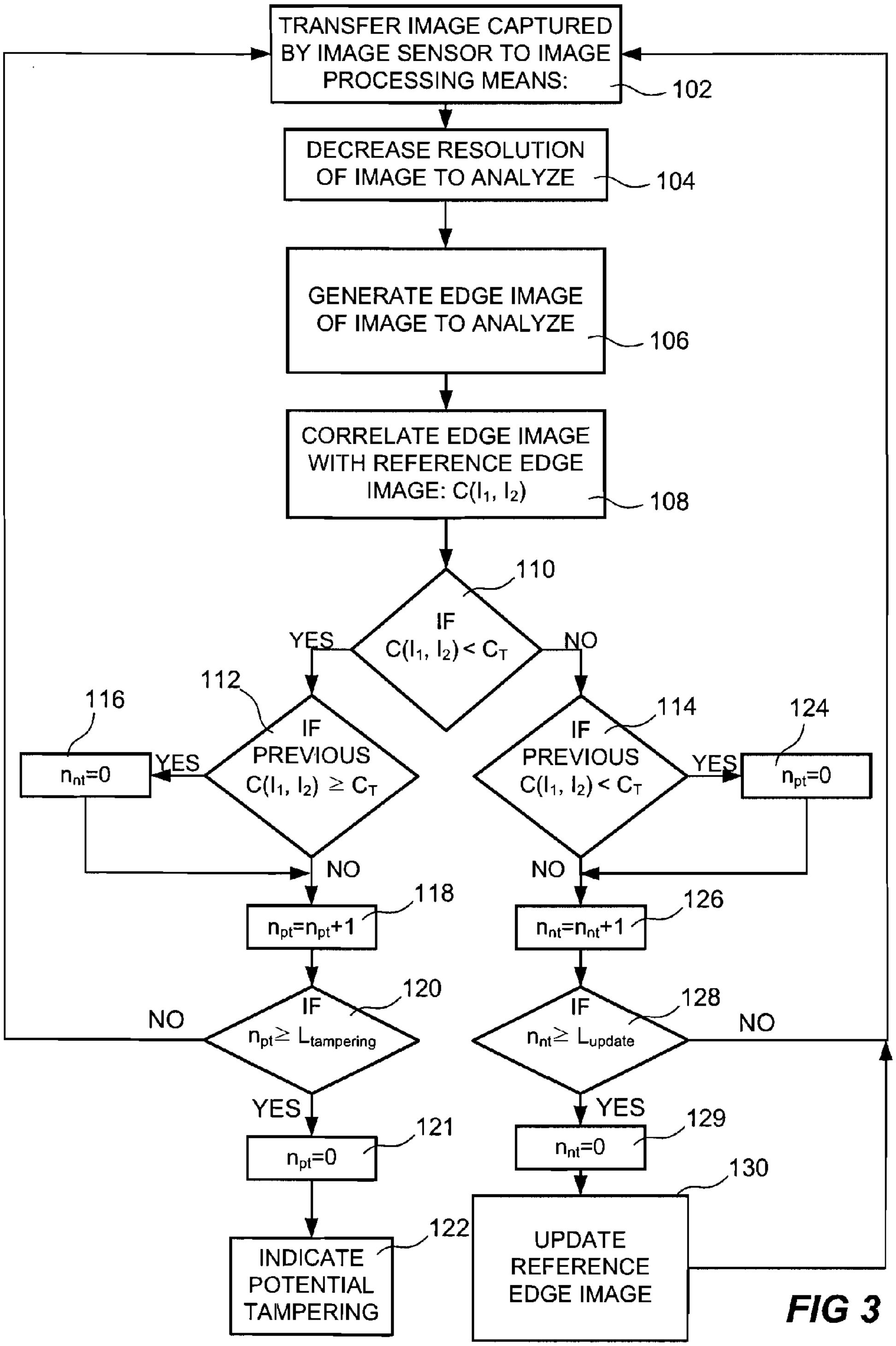
FIG. 3 is a flow chart of a method according to an embodiment of the invention.

In FIG. 3 one embodiment of a method for detecting potential camera tampering is described. The images forming the image sequence are continuously captured by the image sensor of the monitoring camera and are provided to an image processing means of the monitoring camera, step 102. The resolution of the image to be analyzed is decreased, step 104. The resolution of the image may be decreased by any method known to the skilled person. One method of decreasing the resolution is by replacing n×m blocks of pixels with a single pixel, wherein n and m are selected in order to provide the desired resolution. Moreover, n and m may be identical. The single pixel may represent the mean value of the pixels of the block. Another method is to extract the mean values from each jpeg block of an image encoded in accordance with the jpeg standard and to represent each jpeg block by one single pixel.

One advantage of decreasing the resolution of the image is to make the detection method robust for minor movements of the monitoring camera, e.g. from vibrations, wind, etc. Another advantage is that the method for detection requires less memory and less processing power.

In step 106, edges of objects in the image to be analyzed are detected. In other words, the contours within the image to be analyzed are identified. Then an edge image $I_1$ is generated from the image to be analyzed, i.e. the edge image $I_1$ is an image in which the contours in the image to be analyzed are substantially amplified. Methods for detecting edges in an image and for generating an edge image are well known to the skilled person and are described in Digital image processing, Second Edition, (Gonzalez, R. C., and Woods, R. E.), Prentice Hall, 2002.

The generated edge image $I_1$ is then correlated with a reference edge image $I_2$, step 108, resulting in a correlation value $C(I_1, I_2)$. The correlation may be performed by means of any one of a plurality of correlation methods known to the skilled person. One possible method is to use normalized correlation in accordance with the following equation:

$$C(I_1, I_2) = \frac{\sum_{x,y} (I_1(x, y) - \bar{I}_1)(I_2(x, y) - \bar{I}_2)}{\sqrt{\sum_{x,y} (I_1(x, y) - \bar{I}_1)^2 \sum_{x,y} (I_2(x, y) - \bar{I}_2)^2}}$$

The correlation value $C(I_1, I_2)$ is then compared with a correlation threshold value $C_T$, step 110. The correlation threshold value $C_T$ is set to a value indicating a possibly tampered image view.

If the correlation value $C(I_1, I_2)$ is less than the threshold value $C_T$ then the process moves on to step 112. This result means that the correlation between the edge image $I_1$ and the reference edge image $I_2$ is low and thus the similarities between the two images are few or non existing. According to this embodiment such a result indicates possible tampering of the camera view.

If the correlation value $C(I_1, I_2)$ is greater than or equal to the threshold value $C_T$ then the process moves on to step 114. This result means that the correlation between the edge image $I_1$ and the reference edge image $I_2$ is high and thus the similarities between the two images are many or total. According to this embodiment such a result indicates a non tampered camera view.

Hence, if the correlation value $C(I_1, I_2)$ indicates possible tampering in step 110, the process moves to step 112 and checks if the previous correlation value indicated a non tampered image view, i.e. if the previous $C(I_1, I_2) \geqq C_T$.

In step 112, if the correlation value $C'(I_1, I_2)$ from the analysis of the previously analyzed edge image indicated a non tampered image view, then a counter $n_{nt}$ arranged to count the number of consecutively analyzed non tampered images is reset, step 116. In this embodiment the reset is implemented as setting the counter $n_{nt}$ to zero, i.e. $n_{nt}=0$. By resetting the counter $n_{nt}$, when the correlation value indicates possible tampering, it is ensured that the counter only counts a non interrupted sequence of consecutively analyzed images determined not to represent tampered views. Then, when the counter $n_{nt}$ has been reset, the process proceeds to step 118, which will be explained below.

In step 112, if the previous correlation value $C'(I_1, I_2)$, as well as the present correlation value $C(I_1, I_2)$, indicated possible camera tampering of the analyzed image then the process proceeds directly to step 118 where a counter $n_{pt}$ counting the number of consecutively analyzed images being possibly tampered images is set to count the presently analyzed image as a possibly tampered image. In the present embodiment the counter $n_{pt}$ is simply increased by one, i.e. $n_{pt}=n_{pt}+1$.

Accordingly, the counter $n_{pt}$ always counts when the present correlation value $C(I_1, I_2)$ indicates possible camera tampering. However, if the present correlation value $C(I_1, I_2)$ is the first of a potential sequence of analyzed images having correlation values $C(I_1, I_2)$ indicating possible camera tampering, the process includes the additional step of resetting the counter $n_{nt}$ which is arranged to count analyze results indicating non tampering image views.

After the counter $n_{pt}$ has counted the present analysis result in step 118, the resulting value of the counter $n_{pt}$ is compared with a threshold value $L_{tampering}$, step 120. If the number of consecutively analyzed images indicating possible camera tampering reaches a predetermined value, in this embodiment the threshold value $L_{tampering}$, then the counter $n_{pt}$ is reset, step 121, and an indication of a potential tampering with the image view is set. The indication of a potential tampering may also be used to send an alarm to a surveillance centre, to a client computer, a cellular phone, etc. If the number of consecutively analyzed images indicating possible camera tampering is below the predetermined value, then the process returns to step 102 for analyzing another image.

Now returning to step 110, checking if the correlation value $C(I_1, I_2)$ indicates possible tampering. If the correlation value $C(I_1, I_2)$ indicates no tampering, the process moves to step 114 and checks if the previous correlation value indicated a possibly tampered image view, i.e. if the previous $C(I_1, I_2) < C_T$.

If the correlation value from the analysis of the previously analyzed image indicated a possibly tampered image view, a counter $n_{pt}$ counting the number of consecutively analyzed possibly tampered images is reset, step 124. In the present embodiment the reset is implemented as setting the counter $n_{pt}$ to zero, i.e. $n_{pt}=0$. By resetting the counter $n_{pt}$, when the correlation value indicates non tampering of the image view, it is ensured that the counter only counts a non interrupted sequence of analyzed images determined to be possibly tampered with. When the counter $n_{pt}$ has been reset, the process proceeds to step 126, which will be explained below.

In step 114, if the previous correlation value $C'(I_1, I_2)$ as well as the present correlation value $C(I_1, I_2)$, indicated possible camera tampering of the analyzed image, the process proceeds directly to step 126 where a counter $n_{nt}$ counting the number of consecutively analyzed images being non tampered images is set to count the presently analyzed image as a non tampered image. In the present embodiment the counter $n_{nt}$ is simply increased by one, i.e. $n_{nt}=n_{nt}+1$.

Accordingly, the counter $n_{nt}$ always counts when the present correlation value $C(I_1, I_2)$ indicates non tampering of the monitoring camera. However, if the present correlation value $C(I_1, I_2)$ is the first of a potential sequence of analyzed images having correlation values $C(I_1, I_2)$ indicating non tampering of the monitoring camera, the process includes the additional step of resetting the counter $n_{pt}$.

After the counter $n_{nt}$ has counted the present analysis result in step 126, the resulting value of the counter $n_{nt}$ is compared with a threshold value $L_{update}$, step 128. If the number of consecutively analyzed images indicating non tampering of the monitoring camera view reaches the predetermined threshold value $L_{update}$, the counter $n_{nt}$ is reset, step 129, the reference edge image is updated, step 130, and the process is returned to step 102 for analyzing another image. If the number of consecutively analyzed images indicating non tampering of the camera view does not reach the predetermined value, the process is returned to step 102 for analyzing another image.

According to another embodiment, step 112 of FIG. 3 may be removed and step 116 of resetting the counter $n_{nt}$ may be performed any time the counter $n_{pt}$ counts an analyzed image indicating a possibly tampered image view. Correspondingly, step 114 may be removed and step 124 of resetting the counter $n_{pt}$ may be performed any time the counter $n_{nt}$ counts an analyzed image indicating a non tampered image view.

Moreover, the counters $n_{nt}$ and $n_{pt}$ may be arranged to count down from a value corresponding to said $L_{update}$ and $L_{tampering}$, respectively. In such an embodiment, step 130 of updating the reference edge image and step 122 of indicating potential tampering of the image view, are performed if the respective counter reaches zero.

In the above method it is required that a number of consecutively analyzed images are indicating possible tampering before setting an alarm or indicating potential tampering. This makes the method robust in view of temporary "tampering" or false indications, such as a person temporarily standing close to the monitoring camera. Depending on the application of the monitoring camera, i.e. the environment and the purpose of the monitoring camera, and the frequency of the analyzing of images, the threshold value $L_{tampering}$ may vary. For example, when monitoring something like the interior of a buss, where people may come close to the monitoring camera and where they often stay in one place for a relative long time, the threshold value may correspond to the number of analyzed images during a time period of about 30 minutes. When for example monitoring a corridor, where the monitoring camera often is positioned at a distance from people and where people often only pass by, the threshold value may correspond to the number of analyzed images during a time period of about 30 seconds.

The updating of a reference edge image that is performed in step 130 of FIG. 3 may include adding the presently analyzed edge image multiplied with a first factor α to the reference edge image multiplied with a second factor β. In this way the reference edge image is adjusted for long term changes in the area of the camera view. Further, by limiting the influence the present edge image has on the reference edge image, e.g. by setting the factor α to a lower value than β, the effect of objects occasionally occupying the image view is small. Moreover, this update scheme makes use of relatively small amount of memory as it only requires the storage of the reference edge image, which has to be stored anyway, and temporary storage of the present edge image, which has to be temporarily stored for the analysis anyway. Thus, the scheme makes efficient use of the memory.

In one embodiment the second factor β has the value of 1−α. If the new reference edge image is named $\hat{I}_{new}$, the present reference edge image is named $\hat{I}_{pres}$ and the present edge image is named $I_{pres}$, then the update of the reference edge image according to this embodiment may be described by the following equation:

$$\hat{I}_{new}=\alpha I_{pres}(1-\alpha)\hat{I}_{pres}$$

The factor α may be set to a value in the range of 0.05-0.25, depending on the application and the environment of operation. The value may be set high if it is desired that changes in the environment are quickly indicated in the reference edge image. However, there may be a risk of getting objects not desired into the reference edge image. On the other hand if the value is set very low the system may be very slow to adjust the reference edge image for long lasting changes of the environment.

The initial reference edge image may be generated by combining a first edge image with a second edge image in accordance with the equation above. Then the combined edge image is combined with an additional edge image in the same manner. The procedure is repeated for a plurality of images, the number of images may be preset. When the preset number of images have been combined like this, the camera tampering detection process is started and the thus acquired edge image resulting from is set as the reference edge image for use in the camera tampering detection process.

Figure 4:
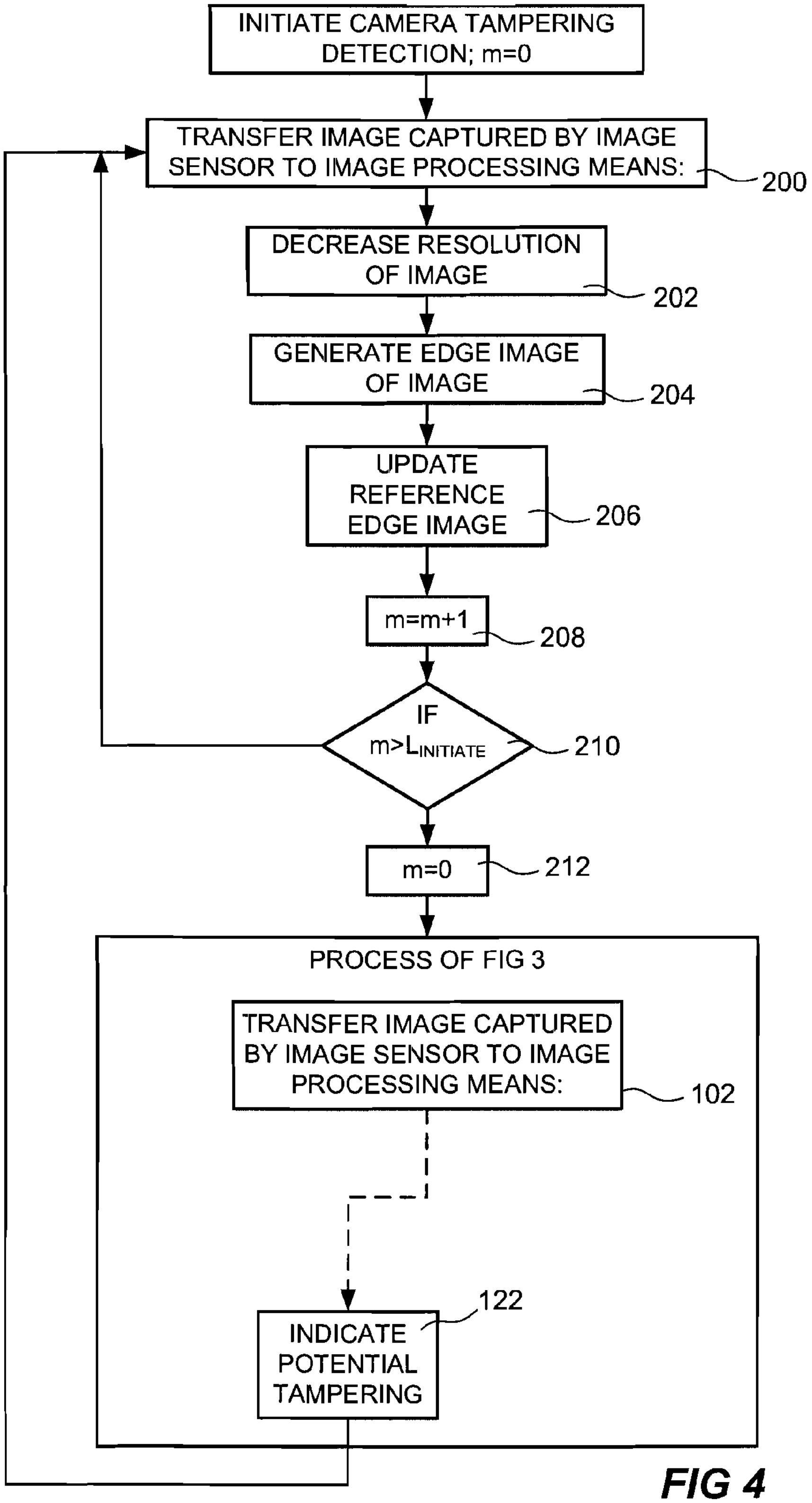
FIG. 4 is a flow chart relating to generation of a reference edge image and operation of the monitoring camera in the event of an alarm indicating camera tampering is set.

According to one embodiment, an initial reference edge image is set when the monitoring camera is started, see FIG. 4. The process for setting the initial reference image, according to this embodiment, includes transferring an image captured by the image sensor to the image processing means, step 200, and then decreasing the resolution of the image, step 202. From the image having decreased resolution an edge image is generated, step 204. The initial reference edge image is updated by combining an edge image with the data of the present reference image in accordance with the equation used for updating the reference image. After the update of the initial reference edge image a counter m counts, step 208. If the counter reaches or passes a limit $L_{initiate}$ the initial reference image is determined to be completed and the counter m is reset and the process continues with the camera tampering detection process of FIG. 3. Otherwise the process returns, to step 200, receiving another image for the initial reference edge image. The images used in forming the initial reference edge image may be each image captured. However, in one embodiment not all captured images are used. The selection of images may be performed in the same manner as for selecting images to be analyzed in the camera tampering detection process.

When an alarm is indicated in the camera tampering detection process of FIG. 3 the monitoring camera is set to generate a new initial reference edge image by returning the process to step 200 of FIG. 4.

A monitoring camera is arranged to generate an image sequence or streaming video at a predetermined frame rate showing a camera view of interest. The frame rate specifies the number of frames per second in the image sequence. The frame rate used in a specific monitoring application is often selected in view of quality requirements of the resulting image sequences. Generally, a high frame rate of 10-30 frames per second is required. Hence 10-30 images have to be processed every second. In addition, a lot of other analysis and image processing may have to be performed simultaneously. In embodiments where much of the processing and analyzing is performed in the monitoring camera it is essential to be able to prioritize.

In one embodiment of the invention not every image provided by the monitoring camera is analyzed in the camera tampering module, i.e. after an image from the image sequence has been selected for analysis, at least one consecutive image of the image sequence is passed without being selected for analysis before the next image from the image sequence is selected for analysis.

In yet another embodiment the number of images of the image sequence that are not selected for analysis between the images selected for analysis may vary during an image sequence. By not selecting every image in the image sequence for analysis by the camera tampering detection module, the camera tampering detection requires less processing power and thus the likelihood of being able to implement the camera tampering detection method in a monitoring camera, which often is equipped with limited processing power, memory, etc, is increased. Moreover, the camera tampering detection method does not require that the temporal distance between images to be analyzed is identical, the number of images between images selected for analysis may be varied depending on the load of the system running the camera tampering detection method. This property of the method is advantageous for devices in which you can not or in which it is difficult to predict the amount of free processing capacity during the operation of the device. Said property is also advantageous in devices or processes where it is impossible to guarantee that every image intended to be analyzed can be analyzed. It is further advantageous in embedded systems which often are provided with limited resources. In such cases the camera tampering method of the present invention may skip analyzing images for a period and then return to analyzing images when the processing load of the device have decreased.

The invention claimed is:

1. A method for identifying possible tampering of a camera view, said method comprising:

receiving an image for analysis from an image sequence, converting the received image into an edge image, generating a similarity value indicating a level of similarity between said edge image and a reference edge image, indicating possible tampering of the camera view if the similarity value is within a specified tampering range, updating the reference edge image by combining a recently analyzed edge image with the reference edge image in case of each one of a predetermined number of consecutively analyzed images does not result in an indication of possible tampering, counting the number of consecutively analyzed images resulting in an indication of possible tampering, and generating an alarm signal in case of each one of a predetermined number of consecutively analyzed images does result in an indication of possible tampering, wherein said predetermined number is larger than one.

2. Method according to claim 1, further comprising the act of decreasing the resolution of the image to be converted into an edge image.

3. Method according to claim 2, further comprising selecting a new image for analysis only after that at least one consecutive image of the image sequence has not been selected for analyzing.

4. Method according to claim 1, further comprising counting by means of a counter $n_{pt}$ in response to said indicating possible tampering of the camera view.

5. Method according to claim 4, further comprising generating an alarm signal if the counter $n_{pt}$ has reached a predetermined alarm limit.

6. Method according to claim 4, further comprising counting by means of a counter $n_{nt}$ in response to said similarity value not being within said tampering range and resetting the counter $n_{nt}$ if the currently analyzed image resulted in the counter $n_{pt}$ counting and the previously analyzed image resulted in the counter $n_{pt}$ counting.

7. Method according to claim 6, further comprising resetting the counter $n_{nt}$ if the currently analyzed image resulted in the counter $n_{pt}$ counting and the previously analyzed image resulted in the counter $n_{nt}$ counting.

8. Method according to claim 6, wherein said updating of the reference edge image is performed if the counter $n_{nt}$ has counted past a predetermined update limit.

9. Method according to claim 1, wherein the updating of the reference edge image by combining a recently analyzed edge image with the reference edge image comprises combining the recently analyzed edge image multiplied with a first factor to the reference edge image multiplied with a second factor.

10. Method according to claim 9, wherein the first factor is of a value less than one and wherein the second factor is of a value corresponding to one minus the first factor.

11. Method according to claim 1, wherein only one edge image and one reference edge image is stored in memory for use by the method at any given time.

12. An apparatus for identifying possible camera tampering, said apparatus comprising:

an edge image generator arranged to receive an image for analysis from an image sequence and arranged to convert a received image into an edge image, a correlation evaluator arranged to generate a similarity value indicating a level of similarity between an edge image and a reference edge image and to indicate possible tampering of the camera view if the similarity value is within a specified tampering range, a reference edge image updater arranged to update the reference edge image by combining a recently analyzed edge image with the reference edge image in case of each one of a predetermined number of consecutively analyzed images do not result in an indication of possible tampering, a counter arranged to count the number of consecutively analyzed images resulting in an indication of possible tampering, and an alarm signal generator arranged to generate an alarm signal in case of each one of a predetermined number of consecutively analyzed images do result in an indication of possible tampering, wherein said predetermined number is larger than one.

13. Apparatus according to claim 12, further comprising a scaling unit arranged to decrease the resolution of the image that is to be converted into an edge image.

14. Apparatus according to claim 12, further comprising a counter $n_{pt}$ arranged to count indications of possible camera tampering.

15. Apparatus according to claim 14, further comprising an alarm generator arranged to generate an alarm signal if the counter $n_{pt}$ has reached a predetermined alarm limit.

16. Apparatus according to claim 14, further comprising a counter $n_{nt}$ arranged to count analyzed images determined not to be within said tampering range, wherein the correlation evaluator additionally is arranged to reset the counter $n_{pt}$ if the currently analyzed image resulted in the counter not counting and the previously analyzed image resulted in the counter $n_{pt}$ counting.

17. Apparatus according to claim 16, wherein the correlation evaluator additionally is arranged to reset the counter $n_{nt}$ if the currently analyzed image resulted in the counter $n_{pt}$ counting and the previously analyzed image resulted in the counter $n_{nt}$ counting.

18. Apparatus according to claim 16, wherein the reference edge image updater is arranged to perform said updating of the reference edge image if the counter $n_{nt}$ has counted past a predetermined update limit.

19. Apparatus according to claim 12, wherein the reference edge image updater is arranged to combine a recently analyzed edge image with the reference edge image by combining the recently analyzed edge image multiplied with a first factor to the reference edge image multiplied with a second factor.

20. Apparatus according to claim 19, wherein the first factor is of a value less than one and wherein the second factor is of a value corresponding to one minus the first factor.

21. A monitoring camera including the apparatus according to claim 12.

22. A monitoring camera performing the method according claim 1.

23. A video server including the apparatus according to claim 12.

24. A video server performing the method according to claim 1.

* * * * *